(12) United States Patent
Takagi

(10) Patent No.: US 11,690,325 B2
(45) Date of Patent: Jul. 4, 2023

(54) PLANT GROWING APPARATUS

(71) Applicants: FUJI SEIKO CO., LTD., Hashima (JP); FUJI SHOJI CO., LTD., Hashima (JP)

(72) Inventor: Chikara Takagi, Hashima (JP)

(73) Assignees: FUJI SEIKO CO., LTD., Hashima (JP); FUJI SHOJI CO., LTD., Hashima (JP)

( * ) Notice: Subject to any disclaimer, the term of this patent is extended or adjusted under 35 U.S.C. 154(b) by 0 days.

(21) Appl. No.: 17/279,447

(22) PCT Filed: Oct. 2, 2019

(86) PCT No.: PCT/JP2019/038964
§ 371 (c)(1),
(2) Date: Mar. 24, 2021

(87) PCT Pub. No.: WO2020/071440
PCT Pub. Date: Apr. 9, 2020

(65) Prior Publication Data
US 2022/0030777 A1    Feb. 3, 2022

(30) Foreign Application Priority Data

Oct. 3, 2018   (JP) .............................. JP2018-188182

(51) Int. Cl.
*A01G 7/04*     (2006.01)
*F21V 9/40*     (2018.01)

(52) U.S. Cl.
CPC ................ *A01G 7/045* (2013.01); *F21V 9/40* (2018.02)

(58) Field of Classification Search
CPC .......... A01G 7/045; A01G 9/249; A01G 7/04; Y10S 47/06; F21V 17/002
See application file for complete search history.

(56) References Cited

U.S. PATENT DOCUMENTS

| 5,111,612 A * | 5/1992 | Takishima | ............. | A01G 7/045 |
| | | | | 47/60 |
| 2012/0075848 A1* | 3/2012 | Yamada | ................. | A01G 7/045 |
| | | | | 362/231 |

(Continued)

FOREIGN PATENT DOCUMENTS

| CN | 1286898 A | 3/2001 |
| CN | 101836566 A | 9/2010 |

(Continued)

OTHER PUBLICATIONS

International Search Report dated Feb. 10, 2020 in PCT/JP2019/038964 filed on Oct. 2, 2019, 3 pages.

(Continued)

*Primary Examiner* — William J Carter
(74) *Attorney, Agent, or Firm* — Oblon, McClelland, Maier & Neustadt, L.L.P.

(57) ABSTRACT

A plant growing apparatus irradiates plants by switching white light from a white light source into light of a color of a specific wavelength by using a partition plate that partitions a light source placement space and a plant growing space. The plant growing apparatus includes: a white light source emitting white light and being provided to face plants to be grown; a light source placement space to place the white light source; and a plant growing space to place the plants to be grown; a housing facility blocking entry of external light; and a partition plate that extends in the housing facility in a horizontal direction, and includes a filter blocking at least one of temperature transfer and air circulation between the light source placement space and the plant growing space, and transmitting light of a specific wavelength in the white light from the white light source.

15 Claims, 6 Drawing Sheets

(56) References Cited

U.S. PATENT DOCUMENTS

| | | | |
|---|---|---|---|
| 2016/0198640 A1 | 7/2016 | Singh et al. | |
| 2018/0288950 A1 | 10/2018 | Ogata et al. | |
| 2019/0223387 A1* | 7/2019 | Kwok | F21K 9/64 |

FOREIGN PATENT DOCUMENTS

| | | | |
|---|---|---|---|
| CN | 101909425 A | 12/2010 |
| CN | 102014608 A | 4/2011 |
| CN | 102149272 A | 8/2011 |
| CN | 203176813 U | 9/2013 |
| CN | 103687478 A | 3/2014 |
| CN | 104115284 A | 10/2014 |
| CN | 104365393 A | 2/2015 |
| CN | 104427857 A | 3/2015 |
| CN | 204362638 U | 6/2015 |
| CN | 204513016 U | 7/2015 |
| CN | 104920092 A | 9/2015 |
| CN | 204598833 U | 9/2015 |
| CN | 105188347 A | 12/2015 |
| CN | 206118607 U | 4/2017 |
| CN | 106665151 A | 5/2017 |
| CN | 106962016 A | 7/2017 |
| CN | 206817208 U | 12/2017 |
| CN | 107529727 A | 1/2018 |
| CN | 207151355 U | 3/2018 |
| GB | 1 307 763 | 2/1973 |
| JP | 51-8939 U | 1/1976 |
| JP | 2-27651 4 A | 11/1990 |
| JP | 11-168993 A | 6/1999 |
| JP | 2002-360037 A | 12/2002 |
| JP | 2005-052105 | 3/2005 |
| JP | 2007-323848 A | 12/2007 |
| JP | 2008-181771 A | 8/2008 |
| JP | 5010864 B2 | 8/2012 |
| JP | 5339385 B2 | 11/2013 |
| JP | 5844458 B2 | 1/2016 |
| TW | 201416610 A | 5/2014 |
| WO | WO2017/047024 A1 | 3/2017 |

OTHER PUBLICATIONS

Combined Chinese Office Action and Search Report dated May 12, 2022 in Patent Application No. 201980061506.4 (with English machine translation), 24 pages.

Singapore Office Action dated Oct. 11, 2022 in Singapore Application No. 11202103013U, 9 pgs.

Dec. 5, 2022 Office Action issued in Chinese Patent Application No. 201980061506.4, and an English machine translation.

Japanese Notice of Reasons of Refusal dated Sep. 20, 2022 in Japanese Patent Application No. 2018-188182 filed Oct. 3, 2018, 5 pages (with English Translation).

* cited by examiner

PLANT GROWING APPARATUS

TECHNICAL FIELD

The present invention relates to a plant growing apparatus configured to irradiate plants by switching white light from a white light source into light of a specific wavelength.

BACKGROUND ART

In a plant factory where edible or ornamental plants are grown in an artificial environment, lighting used to grow the plants can be selected from, for example, blue, blue-green, red, white, etc., depending on a type of the plant, a part of the plant, and a growth period.

Patent Literature 1 describes that blue light and red light are effective for photosynthesis, blue-green light is effective for promoting flowering, and red light is effective for delaying flowering. It describes that these colors of light are obtained by LEDs.

Patent Literature 2 describes that a space on a ground side where plants are planted and a space on a light source side where the plants are irradiated are partitioned by a light-transmissive insulating part (partition plate).

CITATION LIST

Patent Literatures

PTL 1: JP-A-2007-323848
PTL 2: International Publication No. 2017/047024

SUMMARY OF INVENTION

Technical Problem

However, in Patent Literature 1, in order to irradiate plants with light sources of such kinds of colors according to the necessity such as a time of growing plants, a plurality of types of light sources must be prepared and switched each time into a light source of the specific color required.

In Patent Literature 2, a light source for irradiating plants is described, but there was a problem that a light source emitting a color of a specific wavelength had to be prepared when a light source of a specific wavelength was required.

It is an object of the present invention to provide a plant growing apparatus capable of irradiating plants by switching white light from a white light source into light of a color of a specific wavelength by using a partition plate that partitions a light source placement space and a plant growing space.

Solution to Problem

A plant growing apparatus according to the present invention includes: a white light source emitting white light and being provided so as to face plants to be grown; a housing facility including a light source placement space configured to place the white light source and a plant growing space configured to place the plants to be grown; and a partition plate being provided so as to extend in the housing facility in a horizontal direction, blocking at least one of temperature transfer and air circulation between the light source placement space and the plant growing space, and being arranged a filter transmit light of a specific wavelength in the white light from the white light source.

As used herein, the term "light source emitting light of a specific wavelength" refers to a light source emitting light other than a white light source.

In this configuration, without preparing the light source emitting light of a specific wavelength, the partition plate configured to partition between the light source placement space and the plant growing space is used so that plants to be grown can be irradiated only with light of a specific wavelength generating a required color and being allowed to pass through the filter provided on the partitioning plate from the white light from the white light source.

DESCRIPTION OF EMBODIMENTS

First Embodiment

Figure 1:
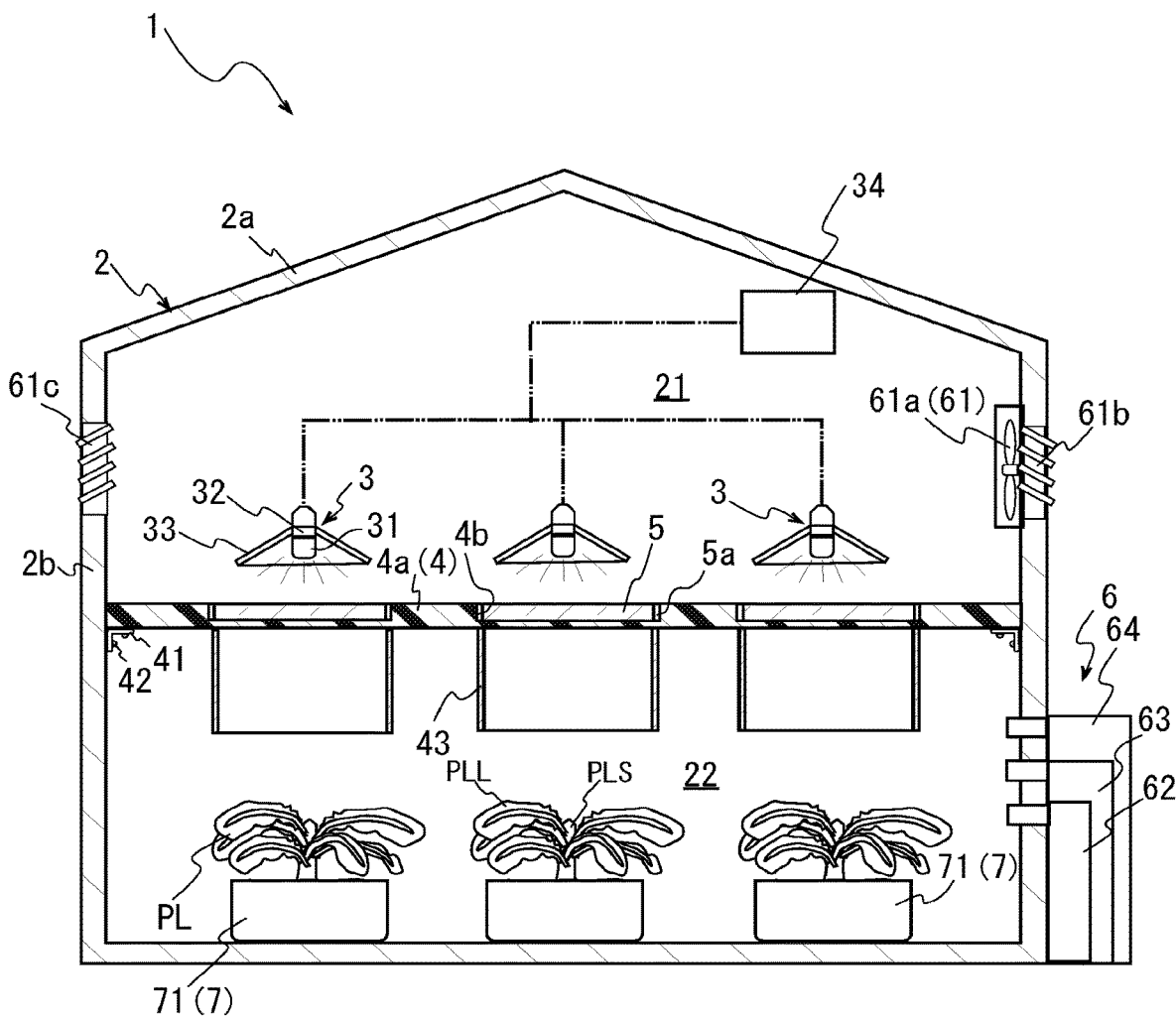
FIG. 1 is a schematic drawing illustrating a plant growing apparatus according to a first embodiment that embodies the present invention.

Referring to FIG. 1 to FIG. 7, a first embodiment in which a plant growing apparatus of the present invention is embodied will be described below. FIG. 1 illustrates a general overview of a plant growing apparatus 1 according to the present invention. The plant growing apparatus 1 includes a housing facility 2, a lighting device 3, a partition plate 4, a filter 5, an air-conditioning system 6, a hydroponic system 7, and a control device (illustration omitted).

(Housing Facility)

The housing facility 2 is formed by assembling, for example, a plurality of steel-made plate members into a square box shape with a gable-shaped roof and has an interior space. A roof portion 2a and a wall portion 2b of the housing facility 2 have a structure to block light from entering the interior from the outside. The housing facility 2 is partitioned into upper and lower spaces by the partition plate 4 extending in the interior space in a horizontal direction. The upper space is a light source placement space 21 in which the lighting device 3 with a white light source 31 are disposed. The lower space is a plant growing space 22 in which plants PL to be grown are placed.

(Lighting Device)

The lighting device 3 includes the white light source 31, a substrate 32, a reflecting plate 33, and a power supply unit 34. For example, a white LED is used as the white light source 31. As the white LED, for example, a type that mixes light emitted from red, green, and blue LED chips to produce white light is used. The white LED is, for example, bullet-shaped and is disposed in the center of the disk-shaped substrate 32. The substrate 32 is provided with the reflecting plate 33 opening downward in an umbrella shape so as to cover from above.

The power supply unit 34 is connected to the white light source 31 via a rectifying circuit from an AC power supply. The power supply unit 34 is provided with a dimming circuit (illustration omitted). The control device (illustration omitted) controls (for example, turning on, turning off, the intensity of the irradiated light) light emitted from the white LED by the dimming circuit according to a growth status of the plants PL to be grown (for example, leaf lettuce).

(Partition Plate, Light-Condensing Device)

The partition plate 4 includes a partition plate body 4a and an attachment part 4b where the filter 5 described later is attached.

The partition plate body 4a is formed in a shape of a square plate from a polycarbonate member through which the white light can be transmitted, for example, and extends in the horizontal direction. Four ends of the partition plate body 4a are fixed to the center of an inner peripheral wall of the housing facility 2 by bolts and nuts 42, for example, via brackets 41. The partition plate body 4a partitions the interior space of the housing facility 2 into upper and lower parts. A rubber sealing material, of which illustration is omitted, seals between four edges of the partition plate body 4a and the inner peripheral wall of the housing facility 2. The partition plate body 4a has the attachment part 4b into which the filter 5, described later, is fitted.

The attachment part 4b is formed as an unpenetrated, bottomed disk-shaped hole opening on the light source placement space 21 side of the partition plate body 4a. Using the bottomed disc-shaped hole that is not penetrated prevents conditioned air in the plant growing space 22 from leaking into the light source placement space 21 when the filter 5 is replaced.

The partition plate 4 blocks the temperature transfer and air circulation between the light source placement space and the plant growing space 22. Specifically, the partition plate 4 mainly blocks heat from the light sources in the light source placement space 21 from moving into the plant growing space 22 and blocks the air conditioned for plant growth in the plant growing space 22 from leaking into the light source placement space 21.

A plurality of light-shielding curtains 43 as light-condensing devices are attached to a lower surface of the partition plate 4 (on the plant growing space 22 side) via brackets (illustration omitted).

Each of the light-shielding curtains 43 is arranged in correspondence with the attachment part 4b of the partition plate 4. The light-shielding curtain 43 is formed, for example, of a polyester fabric material in a cylindrical shape with openings at top and bottom. The light-shielding curtain 43 has a light-shielding function, and an inner peripheral wall portion has a silver-colored reflective fabric portion having a function of reflecting light toward an opposite side of an incident side, so that light transmitted through the filter 5 is concentrated and applied to the plants PL to be grown, which are disposed below the cylindrical opening.

(Filter)

Figure 2:
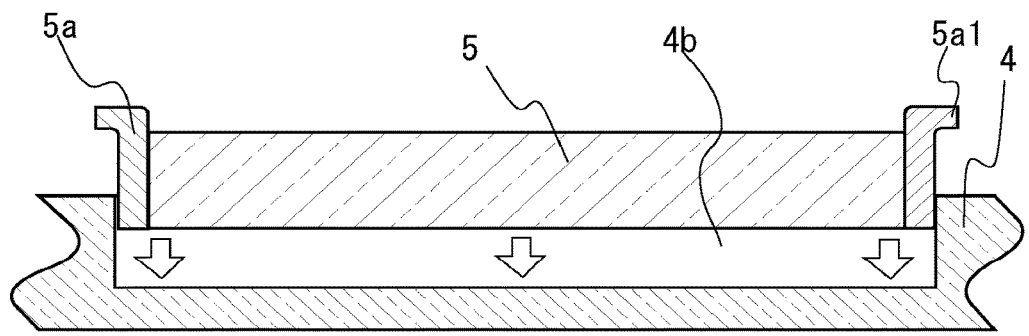
FIG. 2 is a cross-sectional view illustrating an example of filter attachment to a partition plate.
Figure 3:
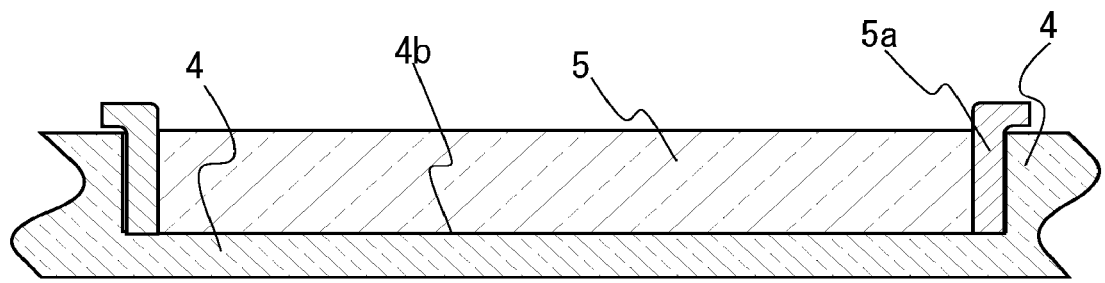
FIG. 3 is a cross-sectional view illustrating a state in which a filter is attached to the partition plate.

For example, an optical bandpass filter that is made of glass and transmits light of a specific wavelength is used for the filter 5. The filter 5 (first filter) is formed in the shape of a disk, and as illustrated in FIGS. 2 and 3, has an attachment edge 5a made of synthetic resin, for example, on an outer circumference thereof. A gripping portion 5a1 is provided on the attachment edge 5a, so that the filter 5 can be easily attached to and detached from the attachment part 4b of the partition plate 4 by an operator gripping the gripping portion Sal with the fingers.

Thus, since the filters 5 (first and second filters) are attached using the partition plate 4 which partitions the interior space of the housing facility 2 into upper and lower parts, the plant growing apparatus 1 can be made capable of irradiating light of the required wavelength with low-cost equipment without requiring a specific holding device.

Figure 4:
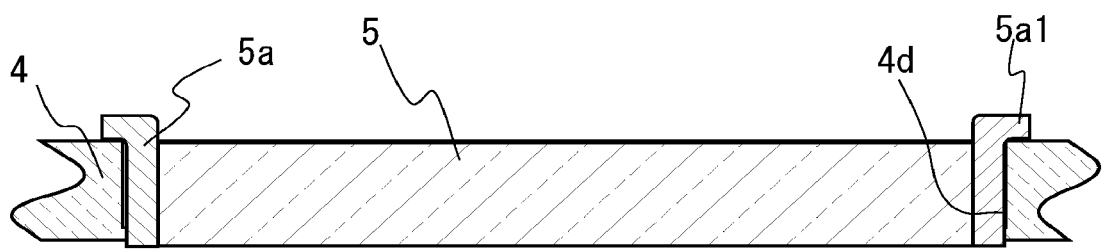
FIG. 4 is a cross-sectional view illustrating another example of a state in which the filter is attached to the partition plate.

Note that the attachment part 4d of the partition plate 4 may be penetrated as illustrated in FIG. 4. In this case, the filter 5 (second filter) transmits the light from the white light source 31 without being affected by the partition plate 4 and allows the plants PL to be grown to be irradiated. The space between the attachment edge 5a and the attachment part 4d is sealed by a sealing material (illustration omitted).

(Air-Conditioning System)

The air-conditioning system 6 is provided with an air ventilation device 61 configured to inhibit the temperature rise caused by the light sources in the light source placement space 21, a temperature control device 62 configured to maintain an appropriate temperature for the plants PL to be grown in the plant growing space 22, a humidity control device 63 configured to control an appropriate humidity, and a carbon dioxide supply device 64.

(Ventilation Device)

The ventilation device 61 has louvers, a fan 61a for forcing exhaust air, and an exhaust port 61b for exhausting inside air to the outside on one wall surface (right side wall surface in FIG. 1) facing the light source placement space 21. The ventilation device 61 is provided with an intake port 61c having louvers on the other wall surface facing the light source placement space 21. The ventilation device 61 draws in cold external air from the intake port 61c and discharges the air in the light source placement space 21 heated by the white light source 31 from the exhaust port 61b to the outside.

(Temperature Control Device, Humidity Control Device)

The temperature control device 62 is, for example, a cooling and heating device and is provided with a temperature sensor (illustration omitted) disposed in the plant growing space 22. The temperature control device 62 adjusts the temperature of the plant growing space 22 based on the temperature detected by the temperature sensor.

The humidity control device 63 is provided with a humidity sensor (illustration omitted) that is disposed in the plant growing space 22. The humidity control device 63 adjusts the humidity of the plant growing space 22 based on the humidity detected by the humidity sensor. For the adjustment of the humidity, when the humidity is low, a humidifier is used to humidify the air, and when the humidity is high, a blower is used to deliver dry air. If the humidity is too high, transpiration becomes inactive, which reduces the transport of water and nutrients and the ability to control the rise in leaf temperature.

(Carbon Dioxide Supply Device)

The carbon dioxide supply device 64 is provided with a carbon dioxide concentration detection sensor (illustration omitted) that is installed in the plant growing space 22. The carbon dioxide supply device 64 adds carbon dioxide necessary for promoting photosynthesis to the air of the plant growing space 22 based on the carbon dioxide concentration detected by the carbon dioxide concentration detection sensor.

(Hydroponic System)

The hydroponic system 7 is provided with a cultivation tank 71 configured to supply water and nutrient solution to roots of the plants PL to be grown, a cultivation solution tank (illustration omitted) configured to store the water and the nutrient solution, and a pump (illustration omitted) configured to transfer the water and the nutrient solution of the cultivation solution tank to the cultivation tank 71.

In the cultivation tank 71, for example, a culture medium (illustration omitted) made of a foamed resin material is provided, and plants PL to be grown are planted in the culture medium. The culture medium supports the plants PL to be grown in a state of being immersed in the circulating water and the nutrient solution and supplies the water and the nutrient solution to the roots of the plants PL to be grown. In the cultivation solution tank, water and concentrated solution are supplied to adjust the concentration of the nutrient solution.

(Control Device)

The control device (illustration omitted) mainly controls the lighting device 3, the temperature control device 62, the humidity control device 63, the adjustment of the amount of carbon dioxide in the carbon dioxide supply device 64, and the operation of the hydroponic system 7.

(Operation)

Next, the operation of the plant growing apparatus 1 will be described, focusing on functions of the lighting device 3 and the filter 5 attached to the partition plate 4. The filter 5 is, for example, the bandpass filter, and the first filter (see FIG. 6) transmitting light with a center wavelength of 450 nm and a half value width of 50 nm and the second filter (see FIG. 7) transmitting light with a center wavelength of 660 nm and a half value width of 50 nm are used.

Figure 6:
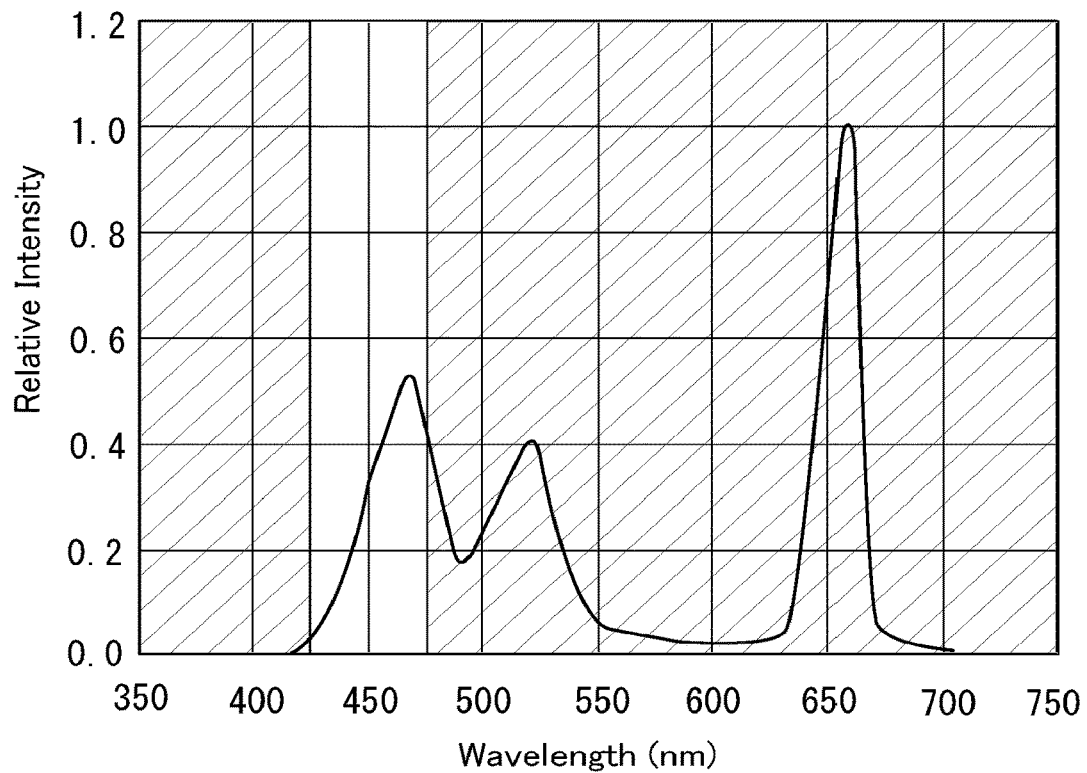
FIG. 6 is a graph illustrating a spectral distribution of a white LED and a state of transmission of blue light through the filter.
Figure 7:
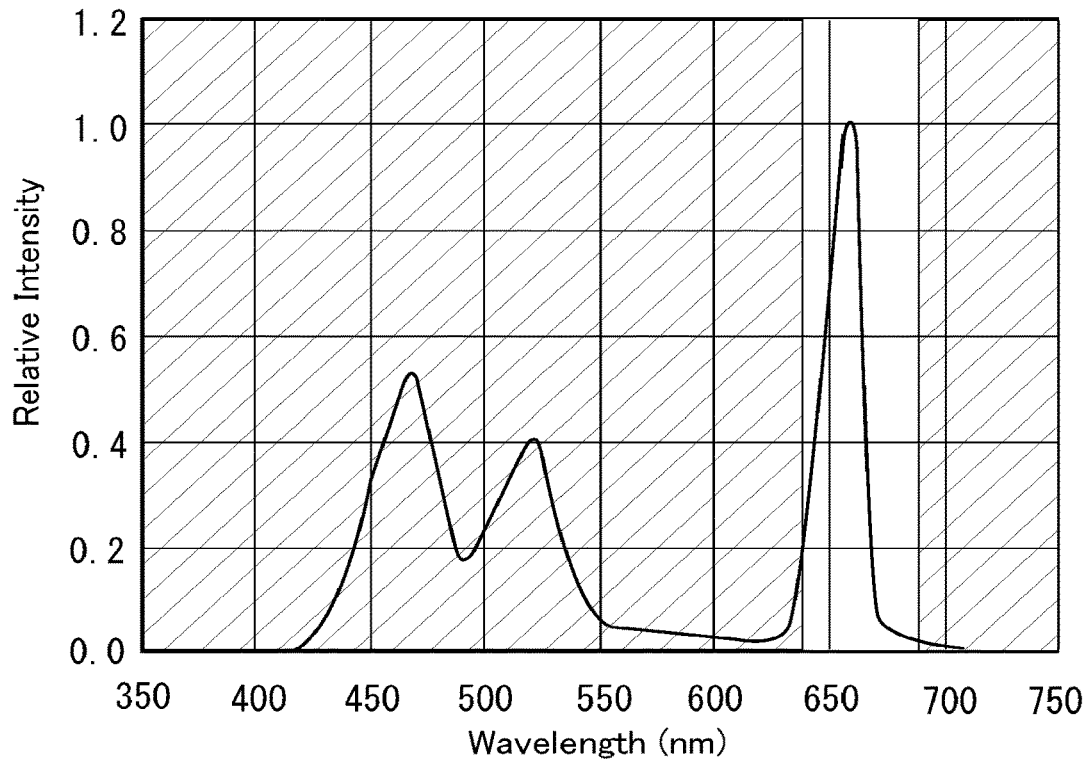
FIG. 7 is a graph illustrating a spectral distribution of the white LED and a state of transmission of red light through the filter.

The white light from the white light source 31 emits light with a wavelength of 420 nm to 680 nm, as illustrated in FIGS. 6 and 7, which are spectral distribution diagrams. A light with a wavelength of 425 nm to 475 nm in the white light from the white light source 31 is transmitted by the first filter. The light transmitted in the case above is mainly blue light.

Likewise, a light with a wavelength of 635 nm to 685 nm in the white light from the white light source 31 is transmitted by the second filter. The light transmitted in the case above is mainly red light.

First, using the first filter in a growth period of the stems PLS of the plants PL to be grown, the stems PLS are irradiated with blue light to inhibit growing of the stems.

Next, when the plants PL to be grown are in the growth period of leaf parts PLL, the first filter is removed from the partition plate 4 and the second filter is attached. Subsequently, by irradiating red light, the growth of the leaf parts PLL is promoted. In this manner, when the plants PL to be grown are vegetables whose leaves are eaten, for example, leaf lettuce, the commercial value can be improved by making the inedible stem portions small and making the leaf portions large.

In the plant growing apparatus 1 of the first embodiment, the partition plate 4 blocks the temperature transfer and the air circulation between the light source placement space 21 and the plant growing space 22. The partition plate 4 is provided with the filter 5 configured to transmit light of a specific wavelength (blue light or red light) in the white light from the white light source 31.

In this configuration, without preparing the light source emitting light of a specific wavelength, the plants PL to be grown can be irradiated only with light of a specific wavelength generating a required color and being allowed to pass through the filter 5 provided on the partitioning plate 4 from the white light from the white light source 31. The filter 5 is attached using the partition plate 4 configured to partition the light source placement space 21 and the plant growing space 22, which eliminates the need for a specific holding device, and thus a low-cost facility is achieved.

The partition plate 4 has the partition plate body 4a and an attachment part 5b to which the filter 5 is attached, and the filter 5 is attachable to and detachable from the attachment part 5b.

In this configuration, the filter 5 provided on the partition plate 4 can be easily replaced depending on the plants PL to be grown.

The filter 5 is provided so as to be attachable to and detachable from the light source placement space 21 side of the partition plate 4.

In this configuration, the filter 5 can be easily attached and detached from the light source placement space 21 side located above the partition plate 4.

The partition plate body 4a transmits white light from the white light source 31. In this configuration, only an area where the filter 5 is present allows transmission of light of a specific wavelength. By simply manipulating a position of the filter 5 or the position of the plants PL to be grown, irradiation of the plants PL to be grown with light of a specific wavelength can be achieved easily.

The plant growing apparatus 1 is further provided with the light-shielding curtains 43 (light-condensing device) that condense light on the plants PL to be grown.

In this configuration, it is possible to condense and irradiate light of the wavelength required for the plants PL to be grown.

The light-shielding curtains 43 are disposed in the plant growing space 22.

In this configuration, all of the light that may be applied to the plant PL to be grown ultimately, including the light transmitted through the partition plate 4, can be condensed and irradiated with high precision within the plant growing space 22.

Second Embodiment

Figure 8:
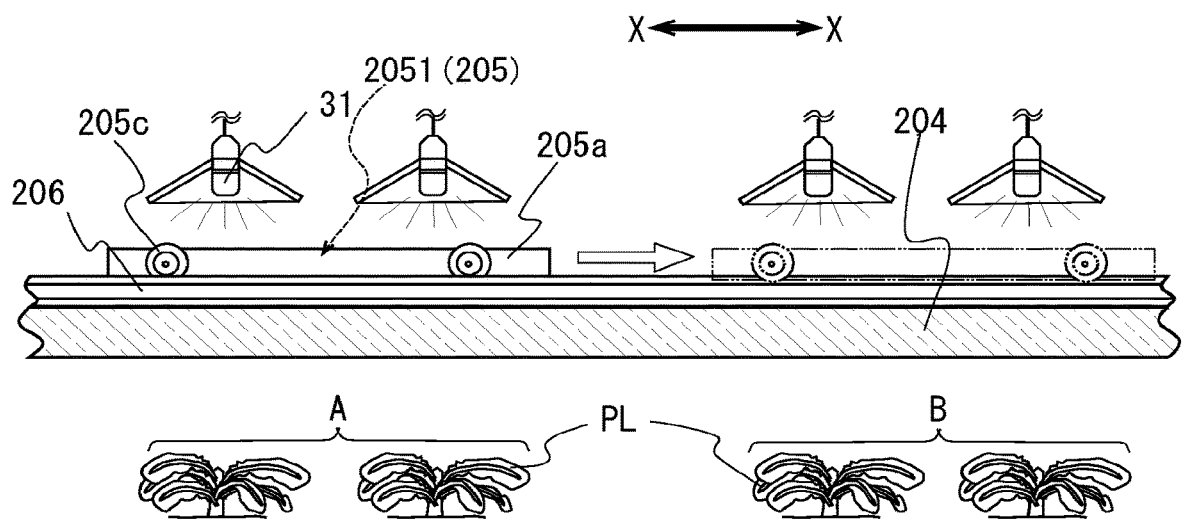
FIG. 8 is a schematic drawing illustrating a positional relationship of a white light source, a filter, a partitioning plate, and plants to be grown in a plant growing apparatus according to a second embodiment.
Figure 9:
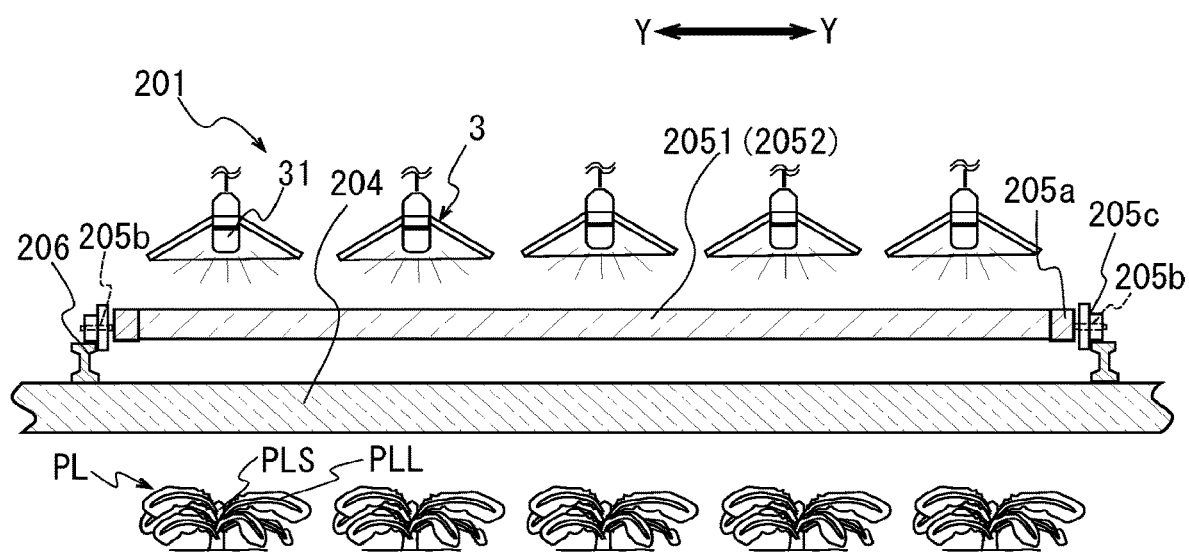
FIG. 9 is a schematic drawing illustrating a positional relationship of the white light source, the filter, the partitioning plate, and the plants to be grown according to the second embodiment.

Next, a second embodiment embodying the plant growing apparatus according to the present invention will be described below with reference to FIG. 8 and FIG. 9.

A plant growing apparatus 201 of the second embodiment is provided with a pair of rails 206 as a horizontal movement device to move a filter 205 horizontally. The rails 206 are laid on the light source placement space 21 side of a partition plate 204. The filter 205 is formed in a rectangular shape having a predetermined thickness. The plurality of plants PL to be grown consists of, for example, two groups, groups A and groups B, each consisting of two rows in an X direction and five rows in a Y direction. It differs from the first embodiment in these respects. Other configurations are similar and are therefore not described. Note that depending on the plurality of plants PL to be cultivated, two rows in the X direction and five rows in the Y direction correspond to a predetermined unit.

The main differences will be described in detail below. A pair of the rails 206 extend along the X direction on the partition plate 204. The rails 206 are formed, for example, by an I-shaped steel member. The filter 205 is formed with a short side in the X direction and a long side in the Y direction, and a peripheral edge 205a is provided at a periphery that is constituted by each side. The peripheral edge 205a is formed, for example, of a stainless steel member, and has two pairs of support shafts 205b aligned in the X direction on each short side. Each of the support shafts 205b extends along the Y direction, and each of the support shafts 205b is provided with rolling wheels 205c that roll on the rails 206 in a rotatable manner. Note that the rails 206 and the rolling wheels 205c constitute a horizontal movement device.

In the lighting device 3, white light sources 31 are disposed corresponding to the plants PL to be grown in the groups A and the groups B respectively, each group has a combination of two rows in the X direction and five rows in the Y direction.

In this configuration, for example, if the sowing time of the group B of the plants PL to be grown is later than that of the group A of the plants PL to be grown, first, a first filter 2051 transmitting blue light is placed to face the group A to inhibit the growth of stems during the growth period of the stems, and then, the first filter 2051 is moved to a position facing the group B to inhibit the growth of the stems during the growth period of the stems of the group B. A second filter 2052 configured to transmit red light is placed to face the group A of the plants PL to be grown to promote the growth of leaves.

In this way, by simply moving the necessary first and second filters 2051, 2052 at the necessary time, one type of white light source 31 can produce effects necessary for growing plants.

In the second embodiment of the plant growing apparatus 201, in a case where the plants PL to be grown are classified and planted in each predetermined unit, the plant growing apparatus 201 is provided with different types of the first filters 2051 and the second filters 2052 corresponding to the predetermined units.

In this configuration, the plants PL to be grown can be irradiated with light of required wavelength at each predetermined unit.

The plant growing apparatus 201 is further provided with the horizontal movement device (rails 206 and rolling wheels 205c) that moves the first and second filters 2051, 2052 horizontally.

In this configuration, the first and second filters 2051, 2052 can be horizontally moved according to the plants PL to be grown in group A and the plants PL to be grown in group B to be irradiated with light of the required wavelength.

Third Embodiment

Figure 12:
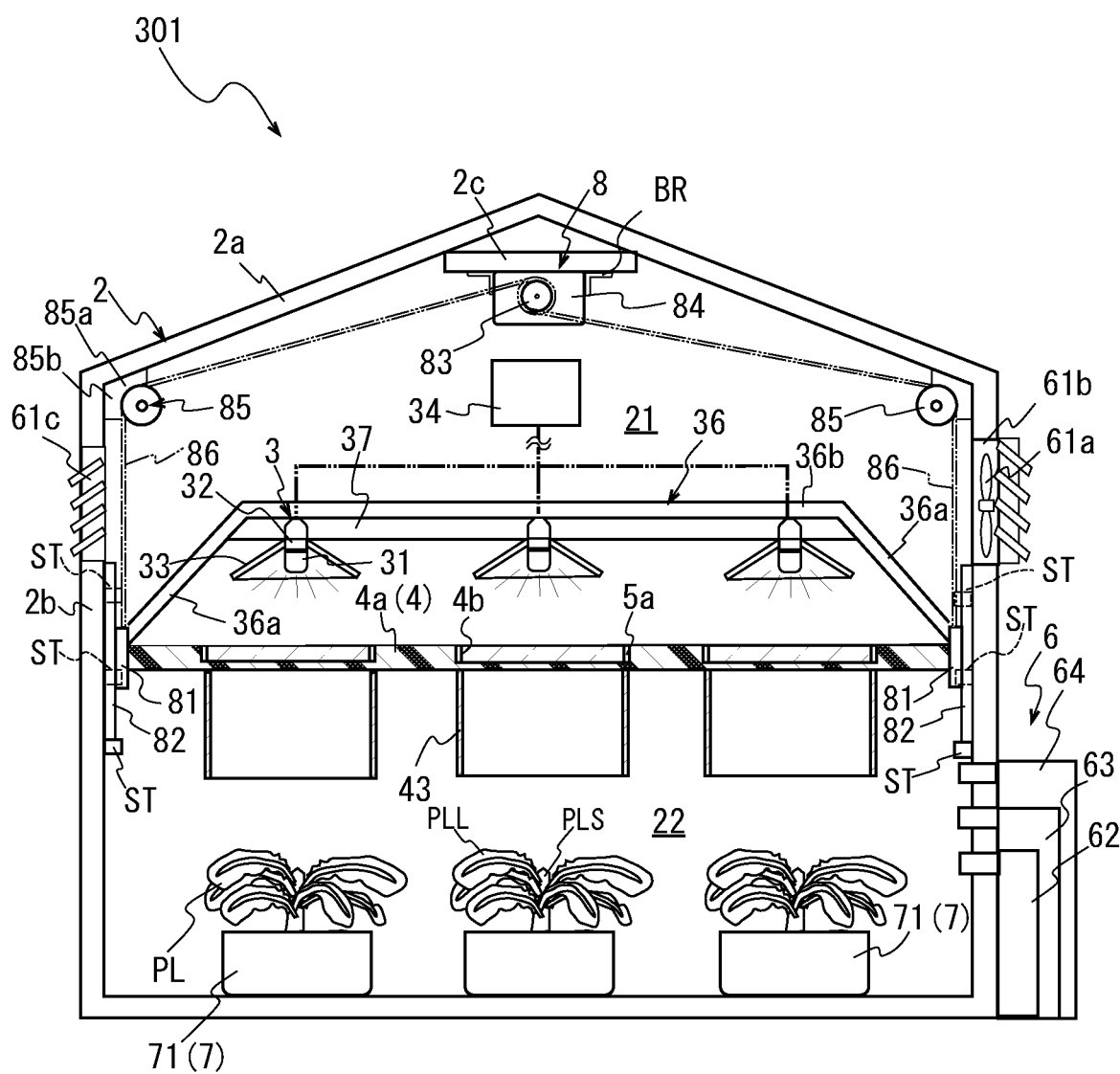
FIG. 12 is a schematic drawing illustrating a plant growing apparatus according to a third embodiment.

Next, referring to FIG. 12, a third embodiment in which the plant growing apparatus of the present invention is embodied will be described below.

A plant growing apparatus 301 of the third embodiment is provided with a vertical movement device 8 configured to move the partition plate 4 up and down. The lighting device 3 is fixed to the partition plate 4 via a support frame 36. These points are different from the first embodiment. Since the other configurations are the same, description will be omitted by designating with the same signs.

The vertical movement device 8 includes sliders 81, vertical guide portions 82 engaging the sliders 81, a winding member 83, an electric motor 84, pulleys 85, and ropes 86.

The sliders 81 are formed, for example, from an acetal resin member, and each are fixed to each of four corners of the partition plate 4. The respective sliders 81 have an engagement portion of which illustration is omitted, configured to engage with the vertical guide portions 82, respectively.

The vertical guide portions 82 are formed in a form of bars extending in the vertical direction made, for example, of stainless steel members. The vertical guide portions 82 have engagement grooves, of which illustration is omitted, in which the engagement portions of the sliders 81 slidably engage, so as to extend along the vertical direction.

The winding member 83 is connected to a drive shaft (not illustrated) of an electric motor 84 to be described later. The winding member 83 is provided with three flange-shaped portions (illustration omitted) circumscribed at predetermined intervals apart in an axial direction and is configured to wind the respective ropes 86 corresponding to each of the four corners around the four peripheral portions partitioned by these three flange-shaped portions.

The electric motor 84 is fixed to a structure 2c of the housing facility 2 provided at a central upper part of the plant growing space 21, for example, by bolts and nuts (not illustrated) via brackets BR. An abbreviated reduction mechanism, of which illustration is omitted is connected to the electric motor 84. The electric motor 84 rotates the winding member 83 in a forward and reverse direction by changing gears to be engaged in the reduction mechanism.

Each rope 86 is formed, for example, of aramid fiber members twisted together. At upper parts of the respective sliders 81 provided at the four corners, connection parts, of which illustration is omitted, are formed, and tips of the ropes 86 are connected thereto. The proximal ends of the respective ropes 86 are fixed to corresponding ones of the four peripheral portions of the winding member 83, respectively.

The pulley 85 is provided with a disk-shaped rotating wheel 85a configured to rotate in contact with the rope 86, and a bearing portion 85b configured to rotatably support a rotating shaft (not illustrated) of the disk-shaped rotating ring 85a. The bearing portions 85b of the respective pulleys 85 are fixed to the upper portions of the four corners of the plant growing space 21 of the housing facility 2 via brackets, of which illustration is omitted, respectively. The disk-shaped rotating wheel 85a of each pulley 85 rotates in contact with a middle portion of each rope 86 and changes a force in a direction of rotation of the electric motor 84 into an upward force.

A plurality of stoppers ST are provided on a wall 2b of the housing facility 2, which protrude so as to be capable of moving in and out of the wall portion 2b. Each stopper ST supports a lower end of the partition plate 4 and is disposed at a predetermined position where the partition plate 4 stops. The stoppers ST allow the partition plate 4 to be stably supported.

The lighting device 3 is fixed to a plurality (five in this embodiment) of support frames 36, both ends of which are fixed to protective edges of which illustration is omitted, provided at the ends of the partition plate 4 and formed to span across the center of the partition plate 4. The protective edge is formed in an angular U-shaped cross-section by a stainless steel member, for example, and a sealing material, for example, made of rubber, is provided on the wall portion 2b side thereof. Each support frame 36 is formed in a rectangular cross-sectional shape by a stainless steel member, for example, and includes a pair of diagonal side members 36a connected to opposite protective edges and stand diagonally upwardly, and a horizontal member 36b extending and communicating with the tips of the diagonal side members 36a in a horizontal direction. A horizontal substrate 37 supporting three white light sources 31 each and extending in the horizontal direction is fixed to a lower surface of the horizontal member 36b.

In this configuration, the partition plate 4 and the white light source 31 can be moved in the vertical direction in accordance with the growth of the plants PL to be grown, and light of a specific wavelength of the plants PL to be grown can be irradiated to the necessary part.

In the third embodiment, the lighting device 3 is moved up and down together with the partition plate 4, but this is not limited thereto. For example, only the partition plate 4 may be moved up and down, and in particular, when the light-shielding curtains 43 as a light-condensing device are provided, the necessary part can be irradiated with light of a specific wavelength of the plants PL to be grown.

Figure 10:
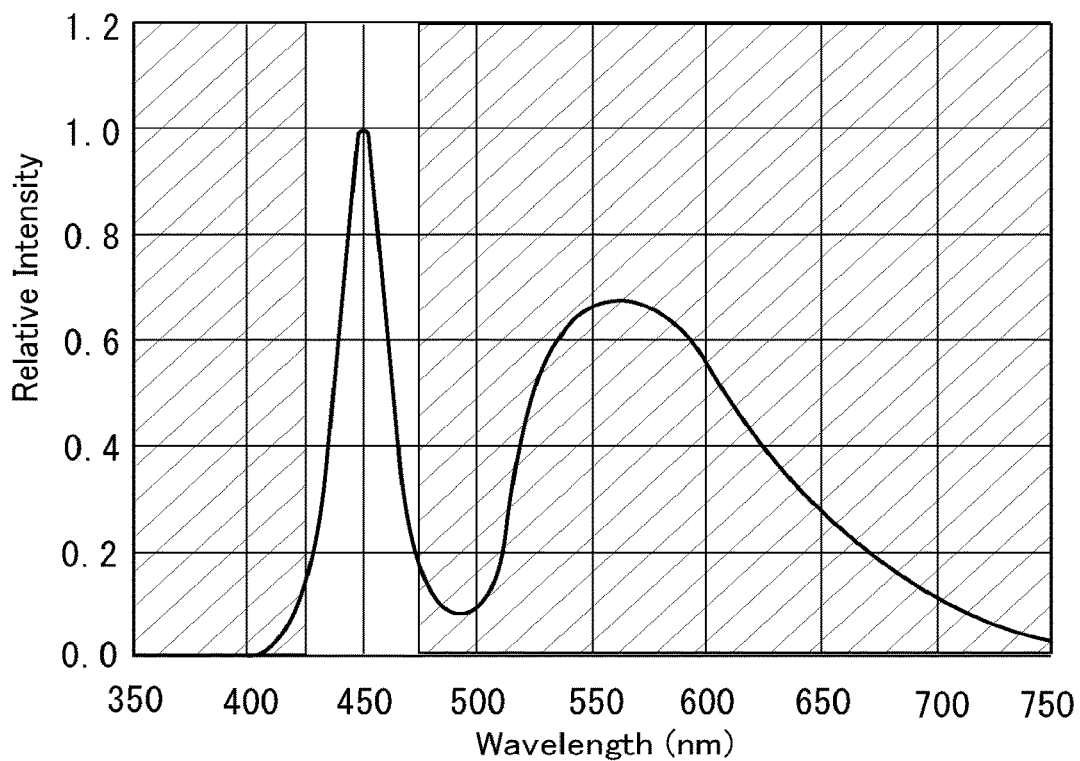
FIG. 10 is a graph illustrating a spectral distribution of the white LED and a state of transmission of blue light through the filter according to another example.
Figure 11:
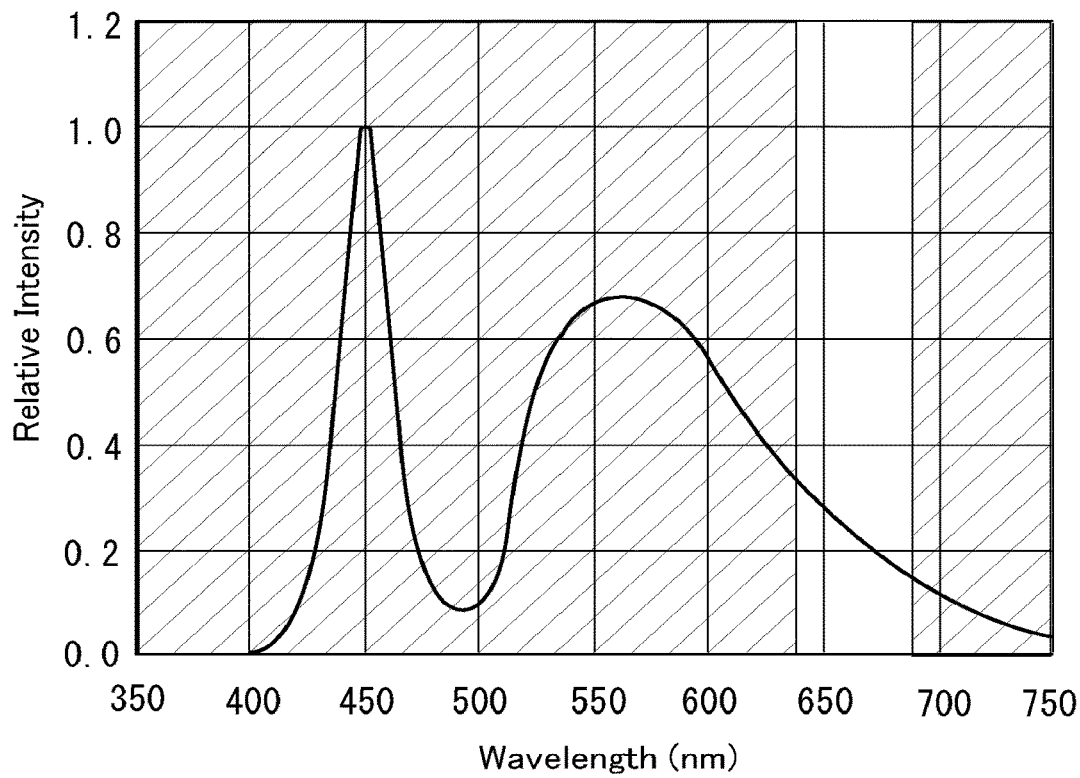
FIG. 11 is a graph illustrating a spectral distribution of the white LED and a state of transmission of blue light through the filter according to another example.

Note that in the above embodiment, the white LED is assumed to be a mixture of light emitted from red, green, and blue LED chips to produce white light, but this is not limited thereto. For example, a blue LED can be coated with a yellow phosphor. In this case, the white light source shows a spectral distribution as illustrated in FIG. 10 and FIG. 11. In this configuration, since there is no peak in the vicinity of 660 nm of the wavelength indicating red, when irradiating red light, output of the white light source is increased using a dimming circuit to irradiate the plants to be grown with the light.

The white light source 31 is not limited to a white LED. For example, a fluorescent or incandescent bulb that emits white light can be used.

Although a polycarbonate plate was used for the partition plate 4, it is not limited thereto, and for example, an acrylic plate, a tempered glass plate, or the like can be used.

Although the light-condensing device is assumed to be the light-shielding curtain 43 formed into a cylindrical shape, it is not limited thereto and may be, for example, a convex lens that condenses the light from the white light source.

Although the horizontal movement device is assumed to include the rails 206 and the rolling wheels 205c, it is not limited thereto; for example, a filter may be placed on a belt conveyor provided on a partition plate and moved horizontally.

Figure 5:
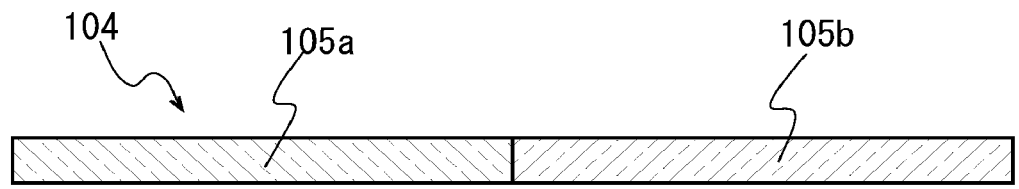
FIG. 5 is a cross-sectional view illustrating an example in which the filter is integrated with the partition plate.

Although the filter 5 is provided separately from the partition plate 4, it is not limited thereto, for example, as illustrated in FIG. 5, an A filter 105a and a B filter 105b may be provided integrally with a partition plate 104.

In this configuration, since the A filter 105a and the B filter 105b are integrally provided on the partition plate 104, the number of parts can be reduced. In addition, when the partition plate 104 is installed, the A filter 105a and the B filter 105b are installed at the same time, which facilitates handling. As illustrated in FIG. 5, by integrally installing the A filter 105a and the B filter 105b having different wavelengths of light to be transmitted, the plant growth can be controlled by moving the plants PL to be grown to a position corresponding to the two types of filters.

Although the filter 5 is a bandpass filter made of glass, it is not limited thereto, and may be combined with a dichroic film, for example, which reflects light of a specific wavelength and transmits light of other wavelengths.

Although the plants to be grown is assumed to be leaf lettuce that contributes to edible use, it is not limited thereto and may be an ornamental plant (rose, *chrysanthemum*, etc.), for example. For example, in the case of roses, a filter that transmits light of a wavelength that advances or delays a blooming period is used.

The present invention is not limited only to the embodiments illustrated above and in the drawings but can be implemented with appropriate changes within the scope not deviating from the gist.

REFERENCE SIGNS LIST

1 . . . plant growing apparatus, 2 . . . housing facility, 21 light source placement space, 22 . . . plant growing space, 3 . . . lighting device, 31 . . . white light source, 4 . . . partition plate, 4a . . . partition plate body, 4b . . . attachment part, 43 . . . light-shielding curtains (light-condensing device), 5 . . . filter, 104 . . . partition plate, 105a . . . A filter, 105b . . . B filter, 201 . . . plant growing apparatus, 204 . . . partition plate, 205 . . . filter, 2051 . . . first filter, 2052 . . . second filter, 206 . . . rail (horizontal movement device), 205c . . . rolling wheel (horizontal movement device), 301 . . . plant growing apparatus, 8 . . . vertical movement device, PL . . . plants to be grown.

The invention claimed is:
1. A plant growing apparatus comprising:
   a white light source emitting white light and being provided so as to face plants to be grown;
   a housing facility including a light source placement space configured to place the white light source and a plant growing space configured to place the plants to be grown, and blocking entry of external light; and
   a partition plate being provided so as to extend in the housing facility in a horizontal direction, blocking at least one of temperature transfer and air circulation between the light source placement space and the plant growing space, and being arranged a filter configured to transmit light of a specific wavelength in the white light from the white light source, the filter including an upper face, a lower face and a side edge extending between the upper face and the lower face, the filter being recessed into the partition plate such that the partition plate is positioned below the lower face of the filter and outside of the side edge of the filter, the filter including an attachment edge on an outer circumference of the filter, the attachment edge including a gripping portion that extends above the partition plate.

2. The plant growing apparatus according to claim 1, wherein the partition plate includes a partition plate body and an attachment part where the filter is attached, and the filter is provided so as to be attachable to and detachable from the attachment part.

3. The plant growing apparatus according to claim 2, wherein the filter is provided so as to be attachable to and detachable from the light source placement space side of the partition plate.

4. The plant growing apparatus according to claim 2, wherein the partition plate body transmits the white light.

5. The plant growing apparatus according to claim 2, wherein in a case where the plants to be grown are classified and planted in each predetermined unit, the plant growing apparatus comprises a plurality of different types of the filters corresponding to the predetermined unit.

6. The plant growing apparatus according to claim 1, wherein the filter is provided integrally with the partition plate.

7. The plant growing apparatus according to claim 1, wherein the plant growing apparatus further includes a horizontal movement device moving the filter horizontally.

8. The plant growing apparatus according to claim 7, wherein the filter is provided so as to be attachable to and detachable from the light source placement space side of the partition plate.

9. The plant growing apparatus according to claim 7, wherein the partition plate transmits the white light.

10. The plant growing apparatus according to claim 7, wherein in a case where the plants to be grown are classified and planted in each predetermined unit, the plant growing apparatus comprises a plurality of different types of the filters corresponding to the predetermined unit.

11. The plant growing apparatus according to claim 1, wherein the plant growing apparatus further includes a light-condensing device condensing light to the plants to be grown.

12. The plant growing apparatus according to claim 11, wherein the light-condensing device is disposed in the plant growing space.

13. The plant growing apparatus according to claim 1, wherein the plant growing apparatus further includes a vertical movement device moving the partition plate vertically.

14. The plant growing apparatus according to claim 1, wherein the filter is formed in the shape of a disk and the attachment edge extends above a central portion of the upper face of the filter.

15. The plant growing apparatus according to claim 1, wherein the attachment edge is made of synthetic resin.

* * * * *